(12) United States Patent
Taylor et al.

(10) Patent No.: US 7,350,099 B2
(45) Date of Patent: Mar. 25, 2008

(54) METHOD AND SYSTEM FOR UTILIZING A LOGICAL FAILOVER CIRCUIT FOR REROUTING DATA BETWEEN DATA NETWORKS

(75) Inventors: William Taylor, Duluth, GA (US); David Massengill, Covington, GA (US); John Hollingsworth, Covington, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 586 days.

(21) Appl. No.: 10/744,281

(22) Filed: Dec. 23, 2003

(65) Prior Publication Data

US 2005/0138203 A1 Jun. 23, 2005

(51) Int. Cl.
*G06F 11/00* (2006.01)

(52) U.S. Cl. .................. 714/4; 714/3; 714/49; 709/239

(58) Field of Classification Search .................... 714/3, 714/4, 43, 27; 709/238, 239
See application file for complete search history.

(56) References Cited

U.S. PATENT DOCUMENTS

| | | | |
|---|---|---|---|
| 4,905,233 A | 2/1990 | Cain et al. | 370/237 |
| 5,016,244 A * | 5/1991 | Massey et al. | 370/217 |
| 5,559,959 A * | 9/1996 | Foglar | 714/43 |
| 6,167,025 A | 12/2000 | Hsing et al. | 370/216 |
| 6,181,679 B1 | 1/2001 | Ashton et al. | 370/244 |
| 6,185,695 B1 * | 2/2001 | Murphy et al. | 714/4 |
| 6,195,416 B1 * | 2/2001 | DeCaluwe et al. | 379/32.05 |
| 6,377,548 B1 | 4/2002 | Chuah | 370/233 |
| 6,581,166 B1 * | 6/2003 | Hirst et al. | 714/4 |
| 6,594,268 B1 | 7/2003 | Aukia et al. | 370/400 |
| 6,763,476 B1 * | 7/2004 | Dangi et al. | 713/502 |
| 6,823,477 B1 * | 11/2004 | Cheng et al. | 714/4 |
| 6,826,184 B1 | 11/2004 | Bryenton et al. | 370/395.1 |
| 6,862,351 B2 | 3/2005 | Taylor | 379/221.06 |
| 6,865,170 B1 * | 3/2005 | Zendle | 370/338 |
| 6,925,578 B2 * | 8/2005 | Lam et al. | 714/4 |

(Continued)

OTHER PUBLICATIONS

Official Action dated Oct. 2, 2006, in U.S. Appl. No. 10/744,281.

(Continued)

*Primary Examiner*—Robert Beausoliel
*Assistant Examiner*—Joseph D Manoskey
(74) *Attorney, Agent, or Firm*—Merchant & Gould, P.C.

(57) ABSTRACT

A method and system are provided for utilizing a logical failover circuit for rerouting data from a failed network circuit in a first data network to a second data network. The network circuit in the first data network includes a logical circuit for communicating data. When a failure in the network circuit in the first data network is detected, a network failover circuit is selected in the second data network. The network failover circuit in the second data network includes a logical failover circuit for communicating data. The data in the failed logical circuit in the first data network is rerouted over the logical failover circuit in the second data network until the failure in the network circuit in the first data network is resolved. After the failed network circuit in the first data network has been restored, the data is rerouted over the restored logical circuit. The first data network may be contained within an Inter-Exchange Carrier and the second data network may be contained within a Local Exchange Carrier.

24 Claims, 5 Drawing Sheets

U.S. PATENT DOCUMENTS

| | | | | |
|---|---|---|---|---|
| 6,983,401 | B2 | 1/2006 | Taylor | 714/45 |
| 7,093,155 | B2 * | 8/2006 | Aoki | 714/4 |
| 7,200,148 | B1 | 4/2007 | Taylor et al. | 370/395.1 |
| 7,209,452 | B2 | 4/2007 | Taylor et al. | 370/241 |
| 7,240,364 | B1 | 7/2007 | Branscomb et al. | 726/9 |
| 2002/0089985 | A1 | 7/2002 | Wahl et al. | 370/395 |
| 2003/0091024 | A1 | 5/2003 | Stumer | 370/352 |
| 2004/0090973 | A1 | 5/2004 | Christie et al. | 370/401 |
| 2004/0141464 | A1 | 7/2004 | Taylor et al. | 370/241 |
| 2004/0172574 | A1 * | 9/2004 | Wing et al. | 714/4 |
| 2005/0013242 | A1 | 1/2005 | Chen et al. | 370/228 |
| 2005/0135237 | A1 | 6/2005 | Taylor et al. | |
| 2005/0135238 | A1 | 6/2005 | Taylor et al. | |
| 2005/0135254 | A1 | 6/2005 | Taylor et al. | |
| 2005/0135263 | A1 | 6/2005 | Taylor et al. | |
| 2005/0138203 | A1 | 6/2005 | Taylor et al. | 709/239 |
| 2005/0138476 | A1 | 6/2005 | Taylor et al. | |
| 2005/0172160 | A1 | 8/2005 | Taylor et al. | |
| 2005/0172174 | A1 | 8/2005 | Taylor et al. | |
| 2005/0237925 | A1 | 10/2005 | Taylor et al. | 370/216 |
| 2005/0238007 | A1 | 10/2005 | Taylor et al. | 370/389 |
| 2005/0240840 | A1 | 10/2005 | Taylor et al. | 714/724 |
| 2006/0146700 | A1 | 7/2006 | Taylor et al. | |

OTHER PUBLICATIONS

Official Action dated Jul. 20, 2007, in U.S. Appl. No. 10/745,170.
Offiicial Action dated Jul. 20, 2007, in U.S. Appl. No. 10/744,283.
Official Action dated Aug. 6, 2007, in U.S. Appl. No. 10/744,555.
Official Action dated Aug. 7, 2007, in U.S. Appl. No. 10/745,116.
Official Action dated Aug. 8, 2007, in U.S. Appl. No. 10/745,117.
Official Action dated Aug. 8, 2007, in U.S. Appl. No. 10/744,921.
Official Action dated Aug. 8, 2007, in U.S. Appl. No. 10/745,168.
Chen, Thomas M. and Liu, Steve S., Management and Control Functions in ATM Switching Systems, IEEE Network, Jul./Aug. 1994.
Meserole, Thomas A. and Prasad, Anil Customer Network Management (CNM) for ATM Public Network Service (M3 Specification), af-nm-0019.000, Rev. 1.04, Oct. 1994.
Mangan, Tim, OA&M; How a frame Relay SLA is Measured and Diagnosed, http://mfaforum.org/frame/Whitepaper/whitepapers/OAMwhitepaper.shtml.

* cited by examiner

METHOD AND SYSTEM FOR UTILIZING A LOGICAL FAILOVER CIRCUIT FOR REROUTING DATA BETWEEN DATA NETWORKS

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to and filed concurrently with U.S. patent application Ser. No. 10/745,117 entitled "Method And System For Providing A Failover Circuit For Rerouting Logical Circuit Data In A Data Network," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, U.S. patent application Ser. No. 10/744,921, entitled "Method And System For Automatically Rerouting Logical Circuit Data In A Data Network," filed on Dec. 23, 2003, U.S. patent application Ser. No. 10/745,168, entitled "Method And System For Automatically Rerouting Logical Circuit Data In A Virtual Private Network," filed on Dec. 23, 2003, U.S. patent application Ser. No. 10/745,116, entitled "Method And System For Automatically Rerouting Data From An Overbalanced Logical Circuit In A Data Network," filed on Dec. 23, 2003, U.S. patent application Ser. No. 10/744,283, entitled "Method And System For Real Time Simultaneous Monitoring Of Logical Circuits In A Data Network," filed on Dec. 23, 2003, U.S. patent application Ser. No. 10/744,555, entitled "Method And System For Prioritized Rerouting Of Logical Circuit Data In A Data Network," filed on Dec. 23, 2003. All of the above-referenced applications are assigned to the same assignee as the present application and are expressly incorporated herein by reference.

TECHNICAL FIELD

The present invention is relates to rerouting data in a data network. More particularly, the present invention is related to utilizing a logical failover circuit in a second data network for rerouting data from a failed network circuit in a first data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host location is delivered to the network through a physical circuit such as a T1 line that links to a switch of the network. The remote device that communicates with the host through the network also has a physical circuit to a switch of the network. The communication path between the switches associated with the host and the remote device that passes through the network is a logical circuit.

In frame relay and ATM networks, end devices do not select different routes for data packets or cells sent between the host and the remote location, but always send the data packets or cells through the same path. A host device may have many logical circuits, such as permanent virtual circuits ("PVCs") or switched virtual circuits ("SVCs"), linked to many remote locations. For example, a PVC sends and receives data packets or cells through the same path leading to the switch of the remote device's physical connection.

The host and remote end devices of a logical circuit may communicate data in data networks operated by a Local Exchange Carrier ("LEC"), an Inter-Exchange Carrier ("IEC"), or both. Each LEC data network is contained within a geographical area known as a local access and transport area ("LATA"). Data networks in each LATA by data networks in one or more IECs for communicating data between the LATAs. Data networks in IECs may also be directly connected to each other. Inter-LATA or Inter-IEC connections are made through physical trunk circuits utilizing fixed logical connections known as Network-to-Network Interfaces ("NNIs").

Periodically, failures may occur to the trunk circuits or the NNIs of logical circuits in a data network resulting in lost data. Currently, such network circuit failures are handled by dispatching technicians on each end of the network circuit in response to a reported failure. One or more technicians may troubleshoot the logical circuit portion of the network circuit by checking the switches in the data network to determine the status of the logical circuit. If a technician determines the logical circuit is operating properly, the technician may then troubleshoot the physical circuit portion of the network circuit to determine the cause of the failure and then repair it. These current methods, however, suffer from several drawbacks. One drawback is that troubleshooting the logical and physical circuits is time consuming and results in dropped data packets or cells until the failure is repaired. Furthermore, in most instances, troubleshooting the physical circuit requires taking the network circuit out of service to perform testing, thus increasing the downtime and loss of data in the network circuit.

It is with respect to these considerations and others that the present invention has been made.

SUMMARY OF THE INVENTION

In accordance with the present invention, the above and other problems are solved by methods for utilizing a logical failover circuit in a data network operated by one carrier, (e.g., a Local Exchange Carrier or "LEC") for rerouting data from a failed logical circuit in a data network operated by a different carrier (e.g., an Inter-Exchange Carrier or "IEC"). When a failure in a logical circuit is detected, the data in the circuit may be rerouted to a "failover data network," thereby minimizing lost data until the trouble in the failed logical circuit is resolved.

According to one method, a failure in a network circuit is detected in a data network. The method includes determining, in a first data network, a failure in a logical circuit. The logical circuit includes at least one logical connection for communicating data in the first data network. The failure in the logical circuit may be determined by determining a failure of a logical connection in the logical circuit in the first data network. Next, the method includes rerouting the data in the failed logical circuit in the first data network to a logical failover circuit in a second data network. The logical failover circuit includes at least one logical failover connection for communicating the data between the first data network and the second data network. In rerouting the data in the failed logical circuit in the first data network to the logical failover circuit in a second data network, the method may include selecting an unused logical connection in the second data network as the logical failover circuit and rerouting the data in the failed logical connection in the logical circuit in the first data network over the logical failover connection. The currently unused logical connection may be capable of communicating the data between the first data network and the second data network. The logical failover connection may be a network-to-network interface ("NNI"). The first data network may be operated by an IEC while the second data network may be operated by an LEC.

After rerouting the data in the failed logical circuit in the first data network to the logical failover circuit in the second data network, the method may further include determining whether the failed logical circuit in the first data network has been restored. If the failed logical circuit in the first data network circuit has been restored, then the method may include rerouting the data from the logical failover circuit in the second data network to the restored logical circuit in the first data network. The logical failover circuit may a permanent virtual circuit ("PVC") or a switched virtual circuit ("SVC"). The data networks may be either frame relay or asynchronous transfer mode ("ATM") networks.

In accordance with other aspects, the present invention relates to a system for inter-network failover of logical circuits between a first data network and a second data network. The system includes a failure detection means for determining a failure in a logical circuit in the first data network. The logical circuit includes a logical connection for communicating data in the first data network. The system further includes a failover means, in communication with the failure detection means. The failover means is operative to reroute the data in the failed logical circuit in the first data network to a logical failover circuit in a second data network. The logical failover circuit includes a logical failover connection for communicating the data between the first data network and the second data network. The first data network may be operated by an IEC while the second data network may be operated by an LEC.

After rerouting the data in the failed logical circuit in the first data network to the logical failover circuit in the second data network, the failover means may be further operative to determine whether the failed logical circuit in the first data network has been restored and if the failed logical circuit in the first data network circuit has been restored, then reroute the data from the logical failover circuit in the second data network to the restored logical circuit in the first data network. The failure detection means may include a logical element module while the failover means may include a network management module.

These and various other features as well as advantages, which characterize the present invention, will be apparent from a reading of the following detailed description and a review of the associated drawings.

DETAILED DESCRIPTION OF THE INVENTION

Embodiments of the present invention provide for a method and system for utilizing a logical failover circuit in a data network operated by one carrier, (e.g., a Local Exchange Carrier or "LEC") for rerouting data from a failed logical circuit in a data network operated by a different carrier (e.g., an Inter-Exchange Carrier or "IEC"). When a failure in a logical circuit is detected, the data in the circuit may be rerouted to a "failover data network," thereby minimizing lost data until the trouble in the failed logical circuit is resolved. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
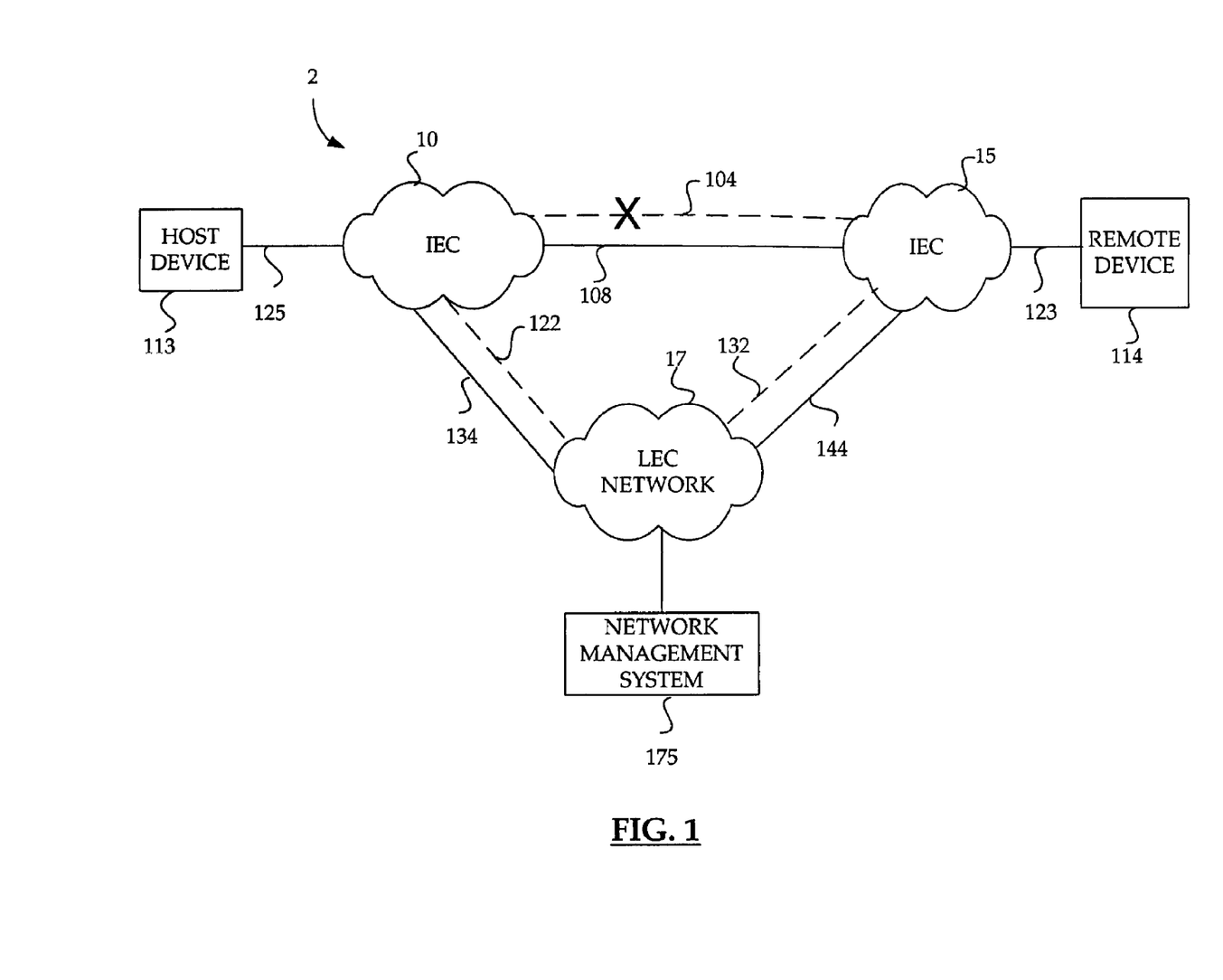
FIG. 1 illustrates a data network according to an embodiment of the invention.

Embodiments of the present invention may be generally employed in a data network 2 as shown in FIG. 1. The data network 2 includes inter-connected IECs 10 and 15. It should be understood that the IECs 10 and 15 may include data networks which may be operated by a commonly owned IEC. It should be further understood that as used in the foregoing description and the appended claims, the IECs 10 and 15 are referred to as the IEC data network.

It will be appreciated by those skilled in the art that the IEC data network may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The IEC data network includes a network circuit which channels data between a host device 113 and a remote device 114 through the IEC 10 and the IEC 15. It will be appreciated by those skilled in the art that the host and remote devices 113 and 114 may be local area network ("LAN") routers, LAN bridges, hosts, front end processors, Frame Relay Access Devices ("FRADs"), or any other device with a frame relay, ATM, or network interface. It will be further appreciated that IEC data network may further include network elements (not shown) which support interworking to enable communications between host and remote devices supporting dissimilar protocols. For example, network elements in a data network which supports interworking may translate frame relay data packets or frames sent from a host FRAD to ATM data packets or cells so that the host device may communicate with a remote device having an ATM interface. The IEC data network may further include one or more interconnected network elements, such as switches (not shown), for transmitting data.

The network circuit between the host device 113 and the remote device 114 in the IEC data network includes a physical circuit 108 as well as a logical circuit 104. As used in the foregoing description and the appended claims, a physical circuit is defined as the physical path that connects the end point of a network circuit to a network device. For example, the physical circuit of the network circuit between the host device 113 and the remote device 114 includes the physical connection 125 between the host device 112 and the IEC 10, the physical connection 108 between the IEC 10 and the IEC 15 and the physical connection 123 between the IEC 15 and the remote device 114. Routers and switches in each IEC carry the physical signal from host and remote end devices 113 and 114 through the physical circuit 108.

It should be understood that the physical connections for the network circuit between the IEC data network and the host and remote devices may be user-to-network interfaces ("UNIs"). As is known to those skilled in the art, the UNI is the physical demarcation point between a user device (e.g., a host device) and a public data network. It will further be understood by those skilled in the art that the physical connection 108 may include trunk circuits for carrying the data between the host device 113 and the remote device 114. It will be further understood by those skilled in the art that the physical connections 123 and 125 may be any of various physical communications media for communicating data such as a 56 Kbps line or a Ti line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the IEC data network may include a variable communication path within the IEC 10 and a fixed communication path (i.e., the logical connection 104) between the IEC 10 and the IEC 15. It will be understood by those skilled in the art that the logical connection 104 in the IEC data network may include a network-to-network interface ("NNI") between the last sending switch in the IEC 10 and the first receiving switch in an IEC 15.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame and service parameters for handling network congestion. For example, in the IEC data network implemented as a frame relay network, the designation DLCI 100 may be used to identify the logical circuit between the host device 113 and the remote device 114. It will be appreciated that in data networks in which logical circuit data is communicated through more than one carrier (e.g., an LEC and an IEC) the DLCI designation for the logical circuit may change in a specific carrier's network.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the logical circuit in the IEC data network may be a permanent virtual circuit ("PVC") available to the network at all times or a temporary or a switched virtual circuit ("SVC") available to the network only as long as data is being transmitted. It should be understood that the IEC data network may further include additional switches or other interconnected network elements (not shown) creating multiple paths within each LATA and IEC for defining each PVC or SVC in the data network. It will be appreciated that the data communicated over the logical connections 104 may be physically carried by the physical connection 108.

It will be appreciated that the switches in a data network may also include a signaling mechanism for determining the status of the logical circuit in the data network. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, the special management frames monitor the status of logical connections and provide information regarding the health of the network. For example, in the IEC data network, the host and remote devices 113 and 114 receive status information from the individual data networks they are connected to in response to a status request sent in a special management frame or cell. The LMI status information may include, for example, whether or not the logical circuit is congested or whether or not the network circuit has failed. It should be understood that the parameters and the signaling mechanism discussed above are optional and that other parameters and mechanisms may also be utilized to obtain connection status information for a network circuit.

The data network 2 may also include a failover network, which is shown as LEC data network 17, in communication with the IEC data network for rerouting logical circuit data, according to an embodiment of the invention. The LEC data network 17 may include a network failover circuit including physical connections 134 and 144 and logical connections 122 and 132 for rerouting logical circuit data in the event of a failure in the network circuit between the host device 113 and the remote device 114 in the IEC data network. The LEC data network 17 will be described in greater detail in the description of FIG. 2 below. The LEC data network 17 is in communication with a network management system 175 which may be utilized to reroute logical circuit data in the IEC data network between the host device 113 and the remote device 114. The network management system 175 will be discussed in greater detail in the description of FIG. 4 below.

Figure 2:
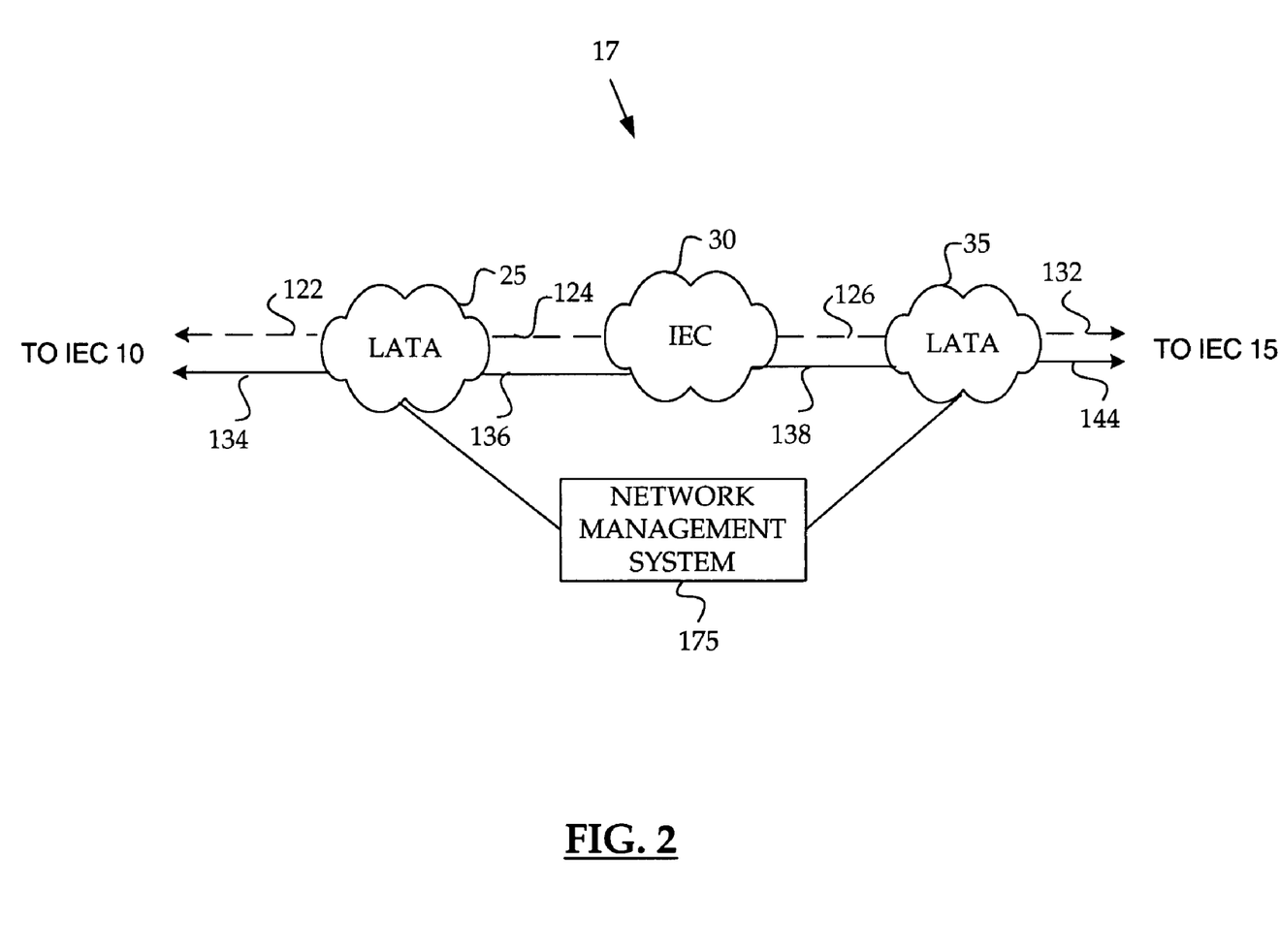
FIG. 2 illustrates a Local Exchange Carrier ("LEC") data network for rerouting logical circuit data, according to an embodiment of the invention.

FIG. 2 illustrates the LEC data network 17 for rerouting logical circuit data, according to one embodiment of the present invention. As shown in FIG. 2, the LEC data network 17 includes a LATA 25, an IEC 30, and a LATA 35. The LEC data network 17 further includes a network failover circuit which includes a physical failover circuit and a logical failover circuit. The physical failover circuit includes the physical connection 134 between the IEC 10 (shown in FIG. 1) and the LATA 25, the physical connection 136 between the LATA 25 and the IEC 30, the physical connection 138 between the IEC 30 and the LATA 35, and the physical connection 144 between the LATA 35 and the IEC 15 (shown in FIG. 1). Similarly, the logical failover circuit may include the logical connection 122 between the IEC 10 (shown in FIG. 1) and the LATA 25, the logical connection 124 between the LATA 25 and the IEC 30, the logical connection 126 between the IEC 30 and the LATA 35, and the logical connection 132 between the LATA 35 and the IEC 15 (shown in FIG. 1). It should be understood that in one embodiment, the network failover circuit illustrated in the LEC data network 17 may include a dedicated physical circuit and a dedicated logical circuit provisioned by a network service provider for rerouting logical data from a failed logical circuit.

Figure 3:
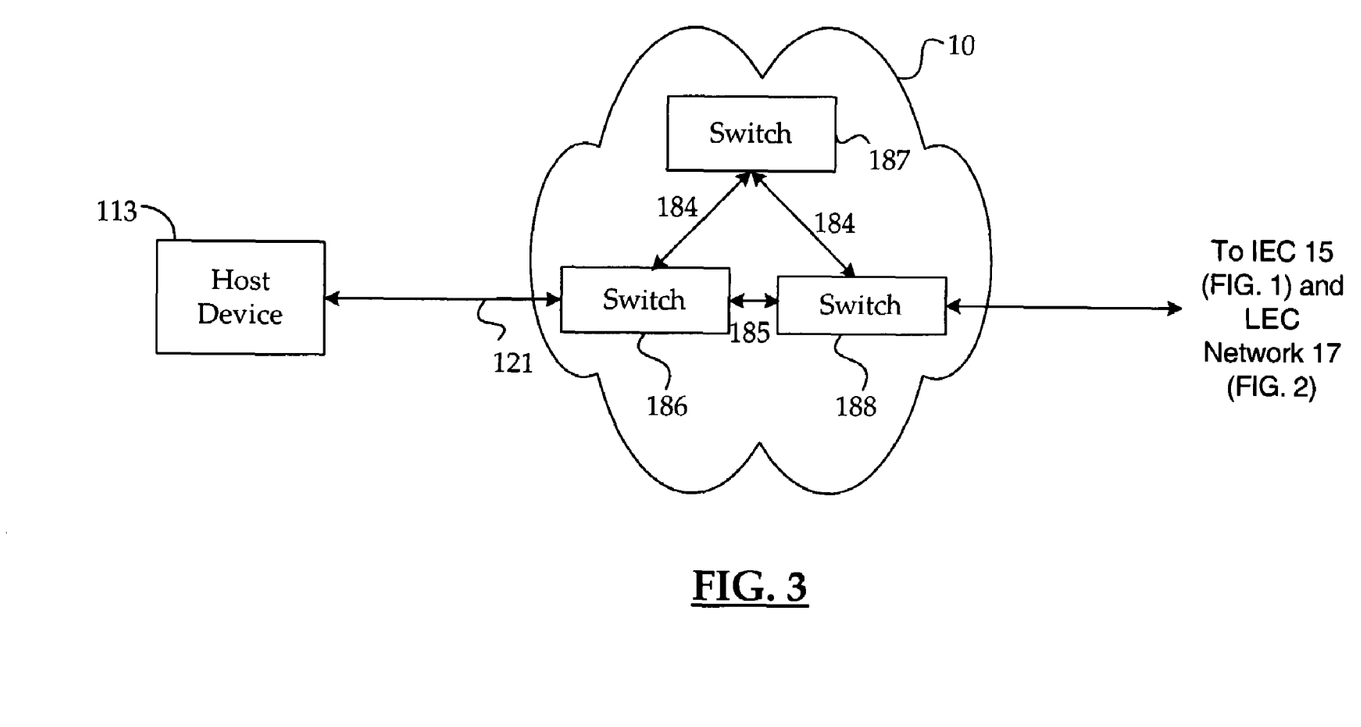
FIG. 3 illustrates an Inter-Exchange Carrier ("IEC") in the data network of FIG. 1, according to an embodiment of the invention.

FIG. 3 illustrates the IEC 10 in the data network 2 described in FIG. 1 above, according to an embodiment of the present invention. As shown in FIG. 3, the IEC 10 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 3, the logical circuit in the IEC 10 may include the communication path 185 between the switches 186 and 188 or the communication path 184 between the switches 186, 187, and 188. As discussed above, it should be understood that the actual path taken by data through the IEC 10 is not fixed and may vary from time to time, such as when automatic rerouting takes place. It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station.

Figure 4:
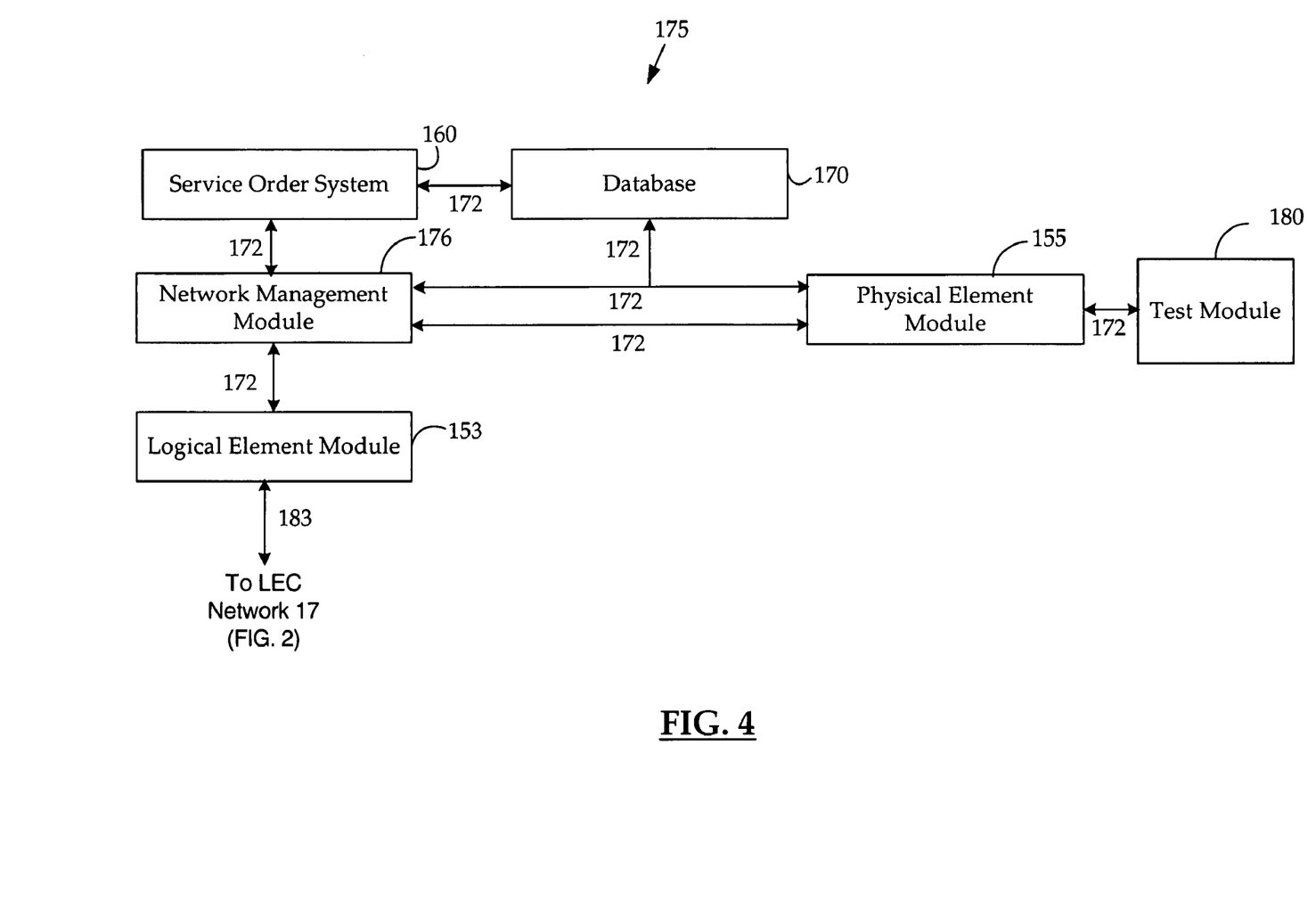
FIG. 4 illustrates a network management system which may be utilized to reroute logical circuit data from the IEC data network shown in FIG. 1, according to an embodiment of the invention.

FIG. 4 illustrates the network management system 175 which may be utilized to automatically reroute logical circuit data from a failed logical circuit in the IEC data network to the LEC data network 17, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit portion of the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches with indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections in a physical circuit. The test module 180 obtains the status of the physical circuit by transmitting "clean" test signals to a test access point (not shown) which "loops back" the signals for detection by the test module 180. It should be understood that there may multiple test access points on each of the physical connections for the physical circuit.

The network management system 175 further includes the network management module 176 which is in communication with the service order system 160, the network database 170, the logical element module 153, and the physical element module 155 through communications channels 172. The network management system 176 is also in communication with the LEC data network 17 via the LATAs 25 and 35 (as shown in FIG. 2). The communications channels 172 may be on a LAN. The network management module 176 may consist of terminals (not shown), which may be part of a general-purpose computer system that displays a map-based GUI of the logical connections in data networks. The network management module 175 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference. An illustrative network management module is the Broadband Network Management System® ("BBNMS") marketed by TELECORDIA™ TECHNOLOGIES, Inc. of Morristown, N.J.

Figure 5:
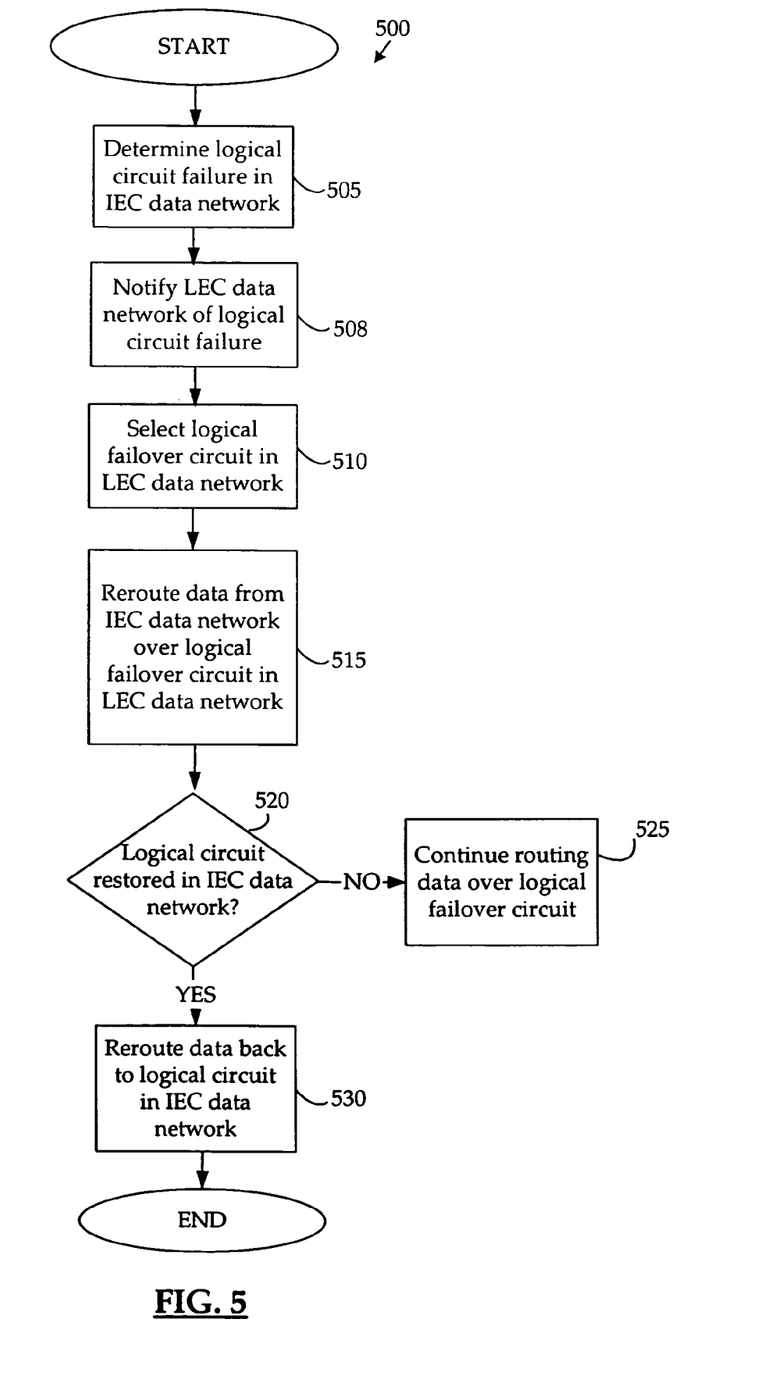
FIG. 5 illustrates a flowchart describing logical operations for rerouting logical circuit data from the IEC data network shown in FIG. 1 to the LEC data network shown in FIG. 2, according to an embodiment of the invention.

FIG. 5 is a flowchart describing logical operations 500 for utilizing the LEC data network 17 as a failover network for rerouting data from a failed logical circuit in the IEC data network of FIG. 1, according to an embodiment of the invention. The logical operations 500 begin at operation 505 where the IEC data network determines that a customer network circuit has failed. For example, a customer of the IEC data network may determine that the remote device 114 is not receiving any data (e.g., frames or cells) sent from the host device 13 (e.g., by reviewing LMI status information in the host device). After receiving a customer trouble report, the IEC data network providing the network circuit may troubleshoot the logical circuit for the network circuit to determine the status of the NNI or logical connection 104. For example, in the data network 2, the "X" marking the logical connection 104 indicates that the logical connection is "down beyond" (i.e., not communicating data) the IECs 10 and 15. It will be appreciated that the IEC data network may have a monitoring system similar to the logical element module described above in the network management system 175, similar to the LEC data network described above in FIG. 3, the IEC data network may to monitor the status of logical circuits.

After determining that a logical circuit in the IEC data network has failed, the logical operations 500 continue at operation 508 where the IEC data network notifies the LEC data network 17 of the logical circuit failure and requests that the data in the failed logical circuit be rerouted over the LEC data network 17. It should be understood that in this embodiment, the LEC data network 17 may have existing physical and logical connections into the IEC data network (as shown in FIGS. 1 and 2) for rerouting logical circuit data. After the LEC data network 17 has been notified of the logical circuit failure in the IEC data network, the network management module 176 initiates a logical circuit failover procedure by selecting a logical failover circuit to reroute the data communicated in the failed logical connection 104. For example, a logical failover circuit may be selected which includes the logical circuit containing logical connections 122, 124, 126, and 132 to reroute the data from the host device 113, through the IEC 10, the LATA 25, the IEC 30, the LATA 35, and finally to the remote device 114.

It will be appreciated that in one embodiment, the logical failover circuit selected may be a dedicated logical circuit, which is only utilized for rerouting logical data from failed a failed logical circuit. In another embodiment, the logical failover circuit may be an existing network circuit, which is normally utilized for communicating data traffic in a data network. In this embodiment, the selection of the logical failover circuit may also include determining whether a logical circuit in the IEC data network or an LEC data network 17 is currently communicating data traffic or is currently unused. If currently unused, the logical circuit may be selected as a failover circuit for rerouting data. It should be understood that in one embodiment, the selection of the logical failover circuit may be manually initiated. For example, a technician at the logical element module 153 or the network management module 176 may utilize a map-based GUI displaying the logical connections in the LEC data network 17 and their status. A dedicated failover circuit (or a currently unused circuit with available logical connections) may then be selected for communicating data from a failed logical circuit. An illustrative method detailing the selection of logical failover circuits for rerouting logical circuit data is presented in co-pending U.S. patent application Ser. No. 10/745,117, entitled "Method And System For Providing A Failover Circuit For Rerouting Logical Circuit Data In A Data Network," filed on Dec. 23, 2003, and assigned to the same assignee as this application, which is expressly incorporated herein by reference. The logical operations 500 then continue from operation 510 to operation 515.

At operation 515, after the logical failover circuit is selected, the data from the failed logical circuit is rerouted over the logical connections or NNIs comprising the logical failover circuit. It will be appreciated that in one embodiment, the reroute of the logical circuit data may be accomplished from the logical element module 153 or the network management module 176 which, in communication with the switches in the LEC data network, instructs the switches to reroute the logical circuit data from the IEC 10. It will be appreciated that the logical circuit ID (e.g., DLCI or VPI/VCI) of the failed logical circuit may be renamed if a failover logical circuit having the same ID is unavailable in the LEC data network.

At operation 520, a determination is made as to whether the failed logical circuit has been restored. This determination may be made, for example, by receiving a restoration message from the IEC data network. If the failed logical circuit has not been restored, the logical operations 500 continue from operation 520 to operation 525 where the rerouted data is maintained on the logical failover circuit by the network management system 175. If however, at operation 520, it is determined that the failed logical circuit has been restored, then the logical operations 520 continue at operation 525 where the logical circuit data on the logical failover circuit is rerouted back onto the restored logical circuit in the IEC data network. Similar to the rerouting of the logical circuit data onto the logical failover circuit, the rerouting of the logical circuit data back onto the restored logical circuit may be accomplished from the logical element module 153 or the network management module 176 which, in communication with the switches in the LEC data network 17 instructs the switches to reroute the logical circuit back to the IEC data network (i.e., the IEC A 10 and the IEC B 15).

It will be appreciated that in one embodiment the above-described logical circuit failover procedure may be initiated as part of a customer subscription service offered by the LEC data network to the IEC data network. The subscription service may include use of the failover circuit for a predetermined time period after the IEC data network's customer data has been rerouted. It will be appreciated that the embodiments of the invention described above provide for a for a method and system for utilizing a logical failover circuit in a data network operated by one carrier, (e.g., a LEC) for rerouting data from a failed logical circuit in a data network operated by a different carrier (e.g., an IEC). When a failure in a logical circuit is detected, the data in the circuit may be rerouted to a "failover data network," thereby minimizing lost data until the trouble in the failed logical circuit is resolved.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for utilizing a logical failover circuit for rerouting data between data networks, the method comprising:

in a first data network, determining a failure in a logical circuit, wherein the logical circuit comprises at least one logical connection for communicating data in the first data network, wherein determining a failure in the logical circuit comprises receiving trap data generated by a switch, the trap data includes a status of the at least one logical connection; and rerouting the data in the failed logical circuit in the first data network to a logical failover circuit in a second data network, wherein rerouting the data in the failed logical circuit in the first data network to a logical failover circuit in the second data network comprises determining whether a logical failover circuit having an identifier which is the same as an identifier associated with the failed logical circuit is available in the second data network and, if a logical failover circuit having an identifier which is the same as an identifier associated with the failed logical circuit is not available in the second data network, then renaming the failed logical circuit identifier, and wherein the logical failover circuit comprises a plurality of logical failover connections for communicating the data between the first data network and the second data network.

2. The method of claim 1, further comprising:

after rerouting the data in the failed logical circuit in the first data network to the logical failover circuit in the second data network, determining whether the failed logical circuit in the first data network has been restored; and if the failed logical circuit in the first data network circuit has been restored, then rerouting the data from the logical failover circuit in the second data network to the restored logical circuit in the first data network.

3. The method of claim 1, wherein rerouting the data in the failed logical circuit in the first data network to the logical failover circuit in a second data network comprises:

selecting at least one unused logical connection in the second data network as the logical failover circuit, wherein the at least one currently unused logical connection is capable of communicating the data between the first data network and the second data network; and rerouting the data in the at least one failed logical connection in the logical circuit in the first data network over the at least one logical failover connection.

4. The method of claim 1, wherein the at least one logical failover connection comprises a network-to-network interface.

5. The method of claim 1, wherein the logical failover circuit is a permanent virtual circuit.

6. The method of claim 1, wherein the logical failover circuit is a switched virtual circuit.

7. The method of claim 1, wherein the first data network is within an inter-exchange carner.

8. The method of claim 1, wherein the second data network is within a local exchange carner.

9. The method of claim 1, wherein the first data network is a frame relay network.

10. The method of claim 1, wherein the first data network is an asynchronous transfer mode (ATM) network.

11. The method of claim 1, wherein the second data network is a frame relay network.

12. The method of claim 1, wherein the second data network is an asynchronous transfer mode (ATM) network.

13. The method of claim 1, wherein rerouting the data in the failed logical circuit in the first data network to a logical failover circuit in a second data network comprises routing the data over the logical failover circuit in the second data network for a predetermined period, wherein the predetermined period is based on a customer subscription for utilizing the logical failover circuit offered by the first data network.

14. A system for utilizing a logical failover circuit for rerouting data between a first data network and a second data network, comprising:

a failure detection means for determining a failure in a logical circuit in the first data network, wherein the logical circuit comprises at least one logical connection for communicating data in the first data network, wherein the failure detection means comprises a logical element module for receiving trap data generated by a switch, the trap data includes a status of the at least one logical connection; and a failover means, in communication with the failure detection means, operative to reroute the data in the failed logical circuit in the first data network to a logical failover circuit in a second data network, wherein rerouting the data in the failed logical circuit in the first data network to a logical failover circuit in the second data network comprises determining whether a logical failover circuit having an identifier which is the same as an identifier associated with the failed logical circuit is available in the second data network and, if a logical failover circuit having an identifier which is the same as an identifier associated with the failed logical circuit is not available in the second data network, then renaming the failed logical circuit identifier, and wherein the logical failover circuit comprises a plurality of logical failover connections for communicating the data between the first data network and the second data network.

15. The system of claim 14, wherein the failover means is farther operative to:
after rerouting the data in the failed logical circuit in the first data network to the logical failover circuit in the second data network, determine whether the failed logical circuit in the first data network has been restored; and
if the failed logical circuit in the first data network circuit has been restored, then reroute the data from the logical failover circuit in the second data network to the restored logical circuit in the first data network.

16. The system of claim 14, wherein the failover means in rerouting the data in the failed logical circuit in the first data network to a logical failover circuit in the second data network, is operative to:
select at least one unused logical connection in the second data network as the logical failover circuit, wherein the at least one currently unused logical connection is capable of communicating the data between the first data network and the second data network; and
reroute the data in the at least one failed logical connection in the logical circuit in the first data network over the at least one logical failover connection.

17. The system of claim 14, wherein the at least one logical failover connection comprises a network-to-network interface.

18. The system of claim 14, wherein the first data network is a frame relay network.

19. The system of claim 14, wherein the first data network is an asynchronous transfer mode (ATM) network.

20. The system of claim 14, wherein the second data network is a frame relay network.

21. The system of claim 14, wherein the second data network is an asynchronous transfer mode (ATM) network.

22. The system of claim 14, wherein the failure detection means comprises a logical element module.

23. The system of claim 14, wherein the failover means comprises a network management module.

24. A system for utilizing a logical failover circuit for rerouting data between a first data network and a second data network, comprising:
a logical element module for determining a failure in a logical circuit in the first data network, wherein the logical circuit comprises at least one logical connection for communicating data in the first data network, wherein the logical element module receives trap data generated by a switch, the trap data being configured to indicate a status of the at least one logical connection; and
a network management module, in communication with the logical element module for determining the failure, operative to:
reroute the data in the failed logical circuit in the first data network to a logical failover circuit in a second data network, wherein rerouting the data in the failed logical circuit in the first data network to a logical failover circuit in the second data network comprises determining whether a logical failover circuit having an identifier which is the same as an identifier associated with the failed logical circuit is available in the second data network and, if a logical failover circuit having an identifier which is the same as an identifier associated with the failed logical circuit is not available in the second data network, then renaming the failed logical circuit identifier, and wherein the logical failover circuit comprises a plurality of logical failover connections for communicating the data between the first data network and the second data network;
after rerouting the data in the failed logical circuit in the first data network to the logical failover circuit in the second data network, determine whether the failed logical circuit in the first data network has been restored; and
if the failed logical circuit in the first data network circuit has been restored, then reroute the data from the logical failover circuit in the second data network to the restored logical circuit in the first data network.

* * * * *